(12) United States Patent
Searles et al.

(10) Patent No.: US 11,906,689 B2
(45) Date of Patent: Feb. 20, 2024

(54) HYDROCARBON WELLS AND METHODS FOR MONITORING FRACTURE MORPHOLOGY OF A FRACTURE THAT EXTENDS FROM A WELLBORE OF THE HYDROCARBON WELLS

(71) Applicant: ExxonMobil Technology and Engineering Company, Spring, TX (US)

(72) Inventors: Kevin H. Searles, Kingwood, TX (US); Ted A. Long, Spring, TX (US); Prajnajyoti Mazumdar, Cypress, TX (US)

(73) Assignee: ExxonMobil Technology and Engineering Company, Spring, TX (US)

( * ) Notice: Subject to any disclaimer, the term of this patent is extended or adjusted under 35 U.S.C. 154(b) by 5 days.

(21) Appl. No.: 17/009,455

(22) Filed: Sep. 1, 2020

(65) Prior Publication Data

US 2021/0088690 A1 Mar. 25, 2021

Related U.S. Application Data

(60) Provisional application No. 62/904,150, filed on Sep. 23, 2019.

(51) Int. Cl.
*G01V 3/30* (2006.01)
*E21B 47/085* (2012.01)
(Continued)

(52) U.S. Cl.
CPC ............... *G01V 3/30* (2013.01); *E21B 43/14* (2013.01); *E21B 43/26* (2013.01);
(Continued)

(58) Field of Classification Search
CPC .......... E21B 47/085; E21B 47/13; G01V 3/30
See application file for complete search history.

(56) References Cited

U.S. PATENT DOCUMENTS 7,424,911 B2 9/2008 McCarthy et al.
7,598,898 B1 10/2009 Funk et al.
(Continued)

FOREIGN PATENT DOCUMENTS

WO 2013012967 A1 1/2013

*Primary Examiner* — Catherine Loikith
(74) *Attorney, Agent, or Firm* — ExxonMobil Technology and Engineering Company—Law Department

(57) ABSTRACT

Hydrocarbon wells include a wellbore, a fracture that extends from the wellbore, and an electromagnetic contrast material positioned within the fracture. The hydrocarbon wells also include a downhole electromagnetic transmitter, which is configured to direct an electromagnetic probe signal incident upon the electromagnetic contrast material, and a downhole electromagnetic receiver, which is configured to receive an electromagnetic resultant signal from the electromagnetic contrast material. Methods for monitoring fracture morphology of a fracture that extends from a wellbore of a hydrocarbon well include flowing an electromagnetic contrast material into a fracture and generating an electromagnetic probe signal. The methods also include modifying the electromagnetic probe signal with the electromagnetic contrast material to generate an electromagnetic resultant signal. The methods further include receiving the electromagnetic resultant signal and determining the morphology of the fracture.

25 Claims, 3 Drawing Sheets

(51) Int. Cl.
  *E21B 47/13* (2012.01)
  *E21B 47/002* (2012.01)
  *E21B 43/14* (2006.01)
  *E21B 43/26* (2006.01)
(52) U.S. Cl.
  CPC ........ *E21B 47/0025* (2020.05); *E21B 47/085* (2020.05); *E21B 47/13* (2020.05)

(56) References Cited

U.S. PATENT DOCUMENTS

| | | | |
|---|---|---|---|
| 8,096,355 B2 * | 1/2012 | McDaniel | G01V 3/30 166/250.1 |
| 8,168,570 B2 | 5/2012 | Barron et al. | |
| 8,354,939 B2 | 1/2013 | McDaniel et al. | |
| 8,826,982 B2 * | 9/2014 | Tambini | G01V 3/30 166/250.01 |
| 9,551,210 B2 * | 1/2017 | Bartel | G01V 3/20 |
| 2012/0146648 A1 | 6/2012 | Eick et al. | |
| 2015/0167459 A1 | 6/2015 | Sen et al. | |
| 2015/0276969 A1 | 10/2015 | Donderici et al. | |
| 2016/0281498 A1 | 9/2016 | Nguyen et al. | |
| 2016/0282502 A1 | 9/2016 | Sharma et al. | |

* cited by examiner

HYDROCARBON WELLS AND METHODS FOR MONITORING FRACTURE MORPHOLOGY OF A FRACTURE THAT EXTENDS FROM A WELLBORE OF THE HYDROCARBON WELLS

CROSS-REFERENCE TO RELATED APPLICATION

This application claims the benefit of U.S. Provisional Application 62/904,150, filed Sep. 23, 2019, the disclosure of which is hereby incorporated by reference in its entirety.

FIELD OF THE INVENTION

The present disclosure relates generally to hydrocarbon wells and/or to methods for monitoring fracture morphology of a fracture that extends from a wellbore of the hydrocarbon wells.

BACKGROUND OF THE INVENTION

During formation and/or completion of hydrocarbon wells, fracture operations may be utilized to fracture a subsurface region within which the hydrocarbon well extends, such as to increase a fluid permeability of the subsurface region. While mechanisms for forming fractures within a subsurface region are well-established, the shape, size, and/or extent of the formed fractures generally is not known. Thus, there exists a need for hydrocarbon wells that include interrogation devices positioned within a fracture and/or for methods of monitoring at least one property of a fracture.

SUMMARY OF THE INVENTION

Hydrocarbon wells and methods for monitoring fracture morphology of a fracture that extends from a wellbore of the hydrocarbon wells are disclosed herein. The hydrocarbon wells include a wellbore that may extend within a subsurface region, a fracture that extends from the wellbore and/or within the subsurface region, and an electromagnetic contrast material that may be positioned within the fracture. The hydrocarbon wells also include a downhole electromagnetic transmitter, which may be configured to direct an electromagnetic probe signal incident upon the electromagnetic contrast material, and a downhole electromagnetic receiver, which may be configured to receive an electromagnetic resultant signal from the electromagnetic contrast material.

The methods include flowing an electromagnetic contrast material from a wellbore and/or into a fracture. The methods also include generating an electromagnetic probe signal. The electromagnetic probe signal may be generated with a downhole electromagnetic transmitter and/or the generating may include generating such that the electromagnetic probe signal is incident upon the electromagnetic contrast material. The methods further include modifying the electromagnetic probe signal with the electromagnetic contrast material and/or to generate an electromagnetic resultant signal. The methods also include receiving the electromagnetic resultant signal. The receiving may include receiving with a downhole electromagnetic receiver. The methods further include determining the morphology of the fracture. The determining may be based, at least in part, on the electromagnetic resultant signal.

DETAILED DESCRIPTION OF THE INVENTION

Figure 1:
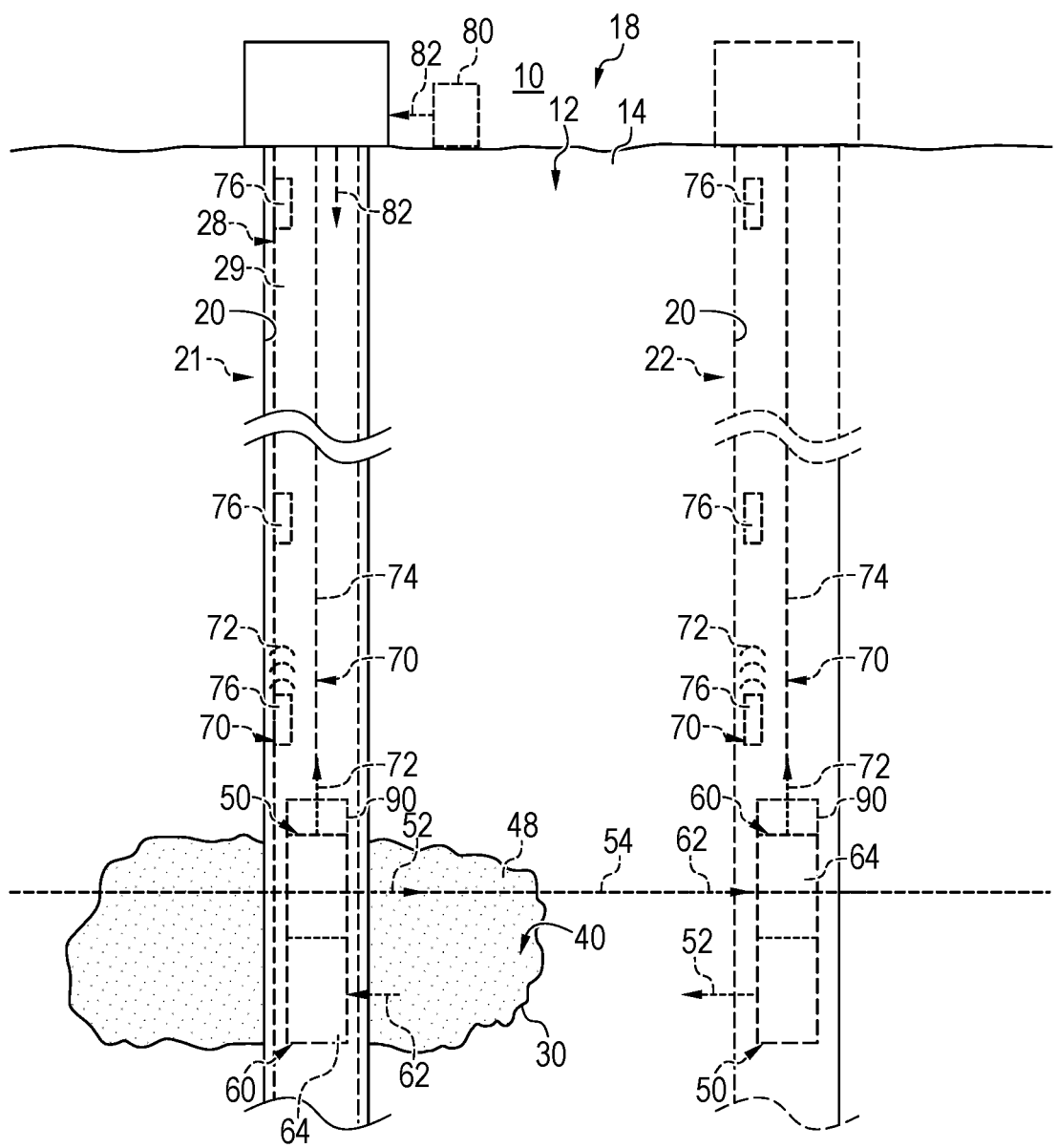
FIG. 1 is a schematic illustration of examples of a hydrocarbon well according to the present disclosure.

FIGS. 1-4 provide examples of hydrocarbon wells 18, of electromagnetic contrast material 40, and/or of methods 100, according to the present disclosure. Elements that serve a similar, or at least substantially similar, purpose are labeled with like numbers in each of FIGS. 1-4, and these elements may not be discussed in detail herein with reference to each of FIGS. 1-4. Similarly, all elements may not be labeled in each of FIGS. 1-4, but reference numerals associated therewith may be utilized herein for consistency. Elements, components, and/or features that are discussed herein with reference to one or more of FIGS. 1-4 may be included in and/or utilized with any of FIGS. 1-4 without departing from the scope of the present disclosure. In general, elements that are likely to be included in a particular embodiment are illustrated in solid lines, while elements that are optional are illustrated in dashed lines. However, elements that are shown in solid lines may not be essential and, in some embodiments, may be omitted without departing from the scope of the present disclosure.

FIG. 1 is a schematic illustration of examples of a hydrocarbon well 18 according to the present disclosure. Hydrocarbon wells 18 include a wellbore 20, which may extend within a subsurface region 12, and a fracture 30, which may extend from the wellbore and/or within the subsurface region. Wellbore 20 also may be referred to herein as extending between a surface region 10 and a subterranean formation 14 of subsurface region 12 and/or as extending within the subterranean formation. Hydrocarbon wells 18 also include an electromagnetic contrast material 40, which may be positioned within fracture 30. Hydrocarbon wells 18 further include a downhole electromagnetic transmitter 50 and a downhole electromagnetic receiver 60.

During operation of hydrocarbon wells 18, and as discussed in more detail herein, downhole electromagnetic transmitter 50 may be configured to direct an electromagnetic probe signal 52 incident upon and/or into electromagnetic contact with electromagnetic contrast material 40. Responsive to receipt of electromagnetic probe signal 52, electromagnetic contrast material 40 may modify the electromagnetic probe signal to produce and/or generate an electromagnetic resultant signal 62. Downhole electromagnetic receiver 60 may be configured to receive electromagnetic resultant signal 62 from electromagnetic contrast material 40. A morphology of fracture 30 then may be monitored, determined, estimated, and/or quantified based, at least in part, on electromagnetic probe signal 52, electromagnetic resultant signal 62, and/or a comparison between the electromagnetic probe signal and the electromagnetic resultant signal.

In some examples of hydrocarbon wells 18, wellbore 20 may be a first wellbore 21, such as illustrated in solid lines in FIG. 1. It is within the scope of the present disclosure, however, that hydrocarbon wells 18 also may include a second wellbore 22, such as illustrated in dashed lines in FIG. 1. When hydrocarbon well 18 includes first wellbore 21 and second wellbore 22, first wellbore 21 may be adjacent second wellbore 22, may be parallel to second wellbore 22, and/or may be at least substantially parallel to second wellbore 22.

In these examples, downhole electromagnetic transmitter 50 may be positioned within one of first wellbore 21 and second wellbore 22, and downhole electromagnetic receiver 60 may be positioned in the other of first wellbore 21 and second wellbore 22. Stated another way, one wellbore 20 may include downhole electromagnetic transmitter 50, and the other wellbore 20 may include downhole electromagnetic receiver 60.

In these examples, downhole electromagnetic transmitter 50 may be configured to direct, or to transmit, electromagnetic probe signal 52 in and/or within a plane 54 that extends between first wellbore 21 and second wellbore 22. Additionally or alternatively, downhole electromagnetic receiver 60 may be configured to receive electromagnetic resultant signal 62 from plane 54. Stated another way, electromagnetic probe signal 52 may be incident upon electromagnetic contrast material 40 within plane 54 and/or electromagnetic resultant signal 62 may be generated within plane 54. Stated yet another way, and in this example, hydrocarbon well 18 may be configured to measure fracture 30 within plane 54 and/or to determine an extent of fracture 30 within plane 54.

In these examples, electromagnetic contrast material 40 may be configured to modify electromagnetic probe signal 52. For example, electromagnetic contrast material 40 may be configured to modify a phase, to modify an amplitude, and/or to modify a frequency of electromagnetic probe signal 52 to produce and/or generate electromagnetic resultant signal 62. Stated another way, a phase, an amplitude, and/or a frequency of electromagnetic resultant signal 62 may differ from a phase, an amplitude, and/or a frequency of a corresponding electromagnetic probe signal 52, which was modified to generate the electromagnetic resultant signal. This difference in phase, amplitude, and/or frequency may be caused by, or due to, interactions, or electromagnetic interactions, between the electromagnetic probe signal and electromagnetic contrast material 40.

An example of electromagnetic contrast material 40 that may be utilized to produce the phase, amplitude, and/or frequency shift may include an electrically conductive material. Examples of electrically conductive material that may be utilized as electromagnetic contrast material 40 include an electrically conductive particulate, a metal, an electrically conductive polymer, an electrically conductive fluid, a ferrofluid, and/or a magnetorheological fluid.

In some examples, downhole electromagnetic transmitter 50 and downhole electromagnetic receiver 60 both may be positioned within wellbore 20, within the same wellbore 20, and/or within a single wellbore 20, such as the leftmost wellbore 20 that is illustrated in FIG. 1. In these examples, downhole electromagnetic transmitter 50 may be configured to transmit electromagnetic probe signal 52 away from wellbore 20, and/or electromagnetic contrast material may be configured to cause at least a portion of electromagnetic resultant signal 62 to be directed back toward wellbore 20 and/or incident upon downhole electromagnetic receiver 60. As an example, electromagnetic contrast material 40 may be configured to reflect at least the portion of electromagnetic probe signal 52 toward wellbore 20 as electromagnetic resultant signal 62. As another example, electromagnetic contrast material 40 may be configured to scatter at least a portion of electromagnetic probe signal 52 toward wellbore 20 as electromagnetic resultant signal 62.

Examples of electromagnetic contrast material 40 that may be utilized to reflect and/or to scatter electromagnetic probe signal 52 to produce and/or generate electromagnetic resultant signal 62 include an electromagnetically shielding material, an electromagnetically shielding liquid, an electromagnetically shielding particulate material, a material that scatters electromagnetic radiation, a liquid that scatters electromagnetic radiation, and/or a particulate that scatters electromagnetic radiation. More specific examples of materials that reflect and/or scatter electromagnetic probe signal 52 and which may be utilized as electromagnetic contrast material 40 include graphite, exfoliated graphite, carbon, carbon black, and/or coke.

In some examples, hydrocarbon wells 18 may be configured to transmit a data stream 72, which may be indicative of the morphology of fracture 30, from downhole electromagnetic receiver 60 and/or to surface region 10. As an example, and as illustrated in dashed lines in FIG. 1, hydrocarbon wells 18 may include a data transmission structure 70, which may be configured to transmit data stream 72. An example of data transmission structure 70 includes an electrical conductor and/or an optical fiber 74, which may extend between the downhole electromagnetic receiver and the surface region and/or may be configured to convey an electrical data stream 72 and/or an optical data stream 72. Another example of data transmission structure 70 includes a downhole wireless communication network 76. Downhole wireless communication network 76, when present, may convey data stream 72 via any suitable wireless signal, examples of which include an acoustic signal, an optical signal, and/or an electromagnetic signal.

As also illustrated in dashed lines in FIG. 1, downhole electromagnetic receiver 60 may include a data transmitter 64. Data transmitter 64, when present, may be configured to generate data stream 72 and/or to transmit data stream 72 to surface region 10 via data transmission structure 70.

In some examples, and as illustrated in dashed lines in FIG. 1, hydrocarbon wells 18 may include a casing string 28. Casing string 28 may extend within wellbore 20 and/or may define a casing conduit 29. In these examples, hydrocarbon wells 18 also may include a fracture fluid supply system 80, which may be configured to provide a fracture fluid stream 82 to casing conduit 29, such as to pressurize the casing conduit. In addition, hydrocarbon wells 18 may include a perforation gun 90. Perforation gun 90, when present, may be positioned within casing conduit 29 and/or may be configured to selectively perforate casing string 28, such as to permit and/or facilitate formation of fractures 30 within subsurface region 12.

In these examples, electromagnetic contrast material 40 may be entrained within fracture fluid stream 82. Additionally or alternatively, electromagnetic contrast material 40, downhole electromagnetic transmitter 50, and/or downhole electromagnetic receiver 60 may be utilized to detect and/or monitor formation of fractures 30. This may include real-time, or at least substantially real-time, detection and/or monitoring of a size, extent, and/or volume of fractures 30 during and/or after formation of fractures 30.

In these examples, fracture fluid stream 82 also may include a proppant material 48, which may be utilized to prop, or to hold open, fracture 30 subsequent to formation thereof. Proppant material 48 may be separate and/or distinct from electromagnetic contrast material 40. Additionally or alternatively, at least a fraction of electromagnetic contrast material 40 may function as and/or may be proppant 48. As an example, and as discussed in more detail herein, electromagnetic contrast material 40 may include an electrically conductive coating material that may coat and/or cover a proppant material, or a conventional proppant material.

Downhole electromagnetic transmitter 50 may include any suitable structure that may be adapted, configured, designed, and/or constructed to generate electromagnetic probe signal 52, to direct the electromagnetic probe signal away from wellbore 20, and/or to direct the electromagnetic probe signal incident upon electromagnetic contrast material 40. As an example, downhole electromagnetic transmitter 50 may include and/or be a ground penetrating radar transmitter. In some examples, electromagnetic probe signal 52 may include and/or be a polarized electromagnetic probe signal. In some examples, electromagnetic probe signal 52 may have a probe signal frequency in the high frequency (HF), very high frequency (VHF), ultra high frequency (UHF), and/or super high frequency (SHF) ranges. More specific examples of the probe signal frequency include frequencies of at least 1 kilohertz (KHz), at least 10 KHz, at least 50 KHz, at least 100 KHz, at least 500 KHz, at least 1 megahertz (MHz), at least 5 MHz, at least 10 MHz, at least 25 MHz, at least 50 MHz, at least 100 MHz, at least 250 MHz, at least 500 MHz, at least 1 gigahertz (GHz), at most 5 GHz, at most 2.5 GHz, at most 1 GHz, at most 500 MHz, at most 250 MHz, and/or at most 100 MHz.

Figure 2:
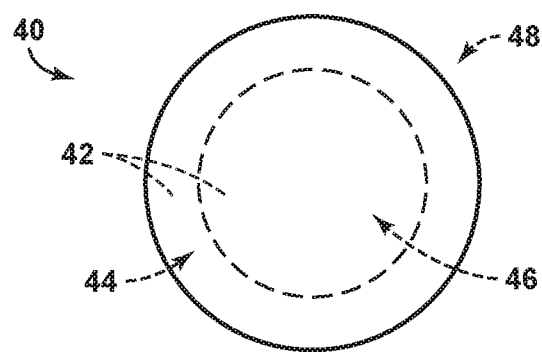
FIG. 2 is a schematic illustration of examples of electromagnetic contrast material that may be included in and/or utilized with hydrocarbon wells and/or methods, according to the present disclosure.
Figure 3:
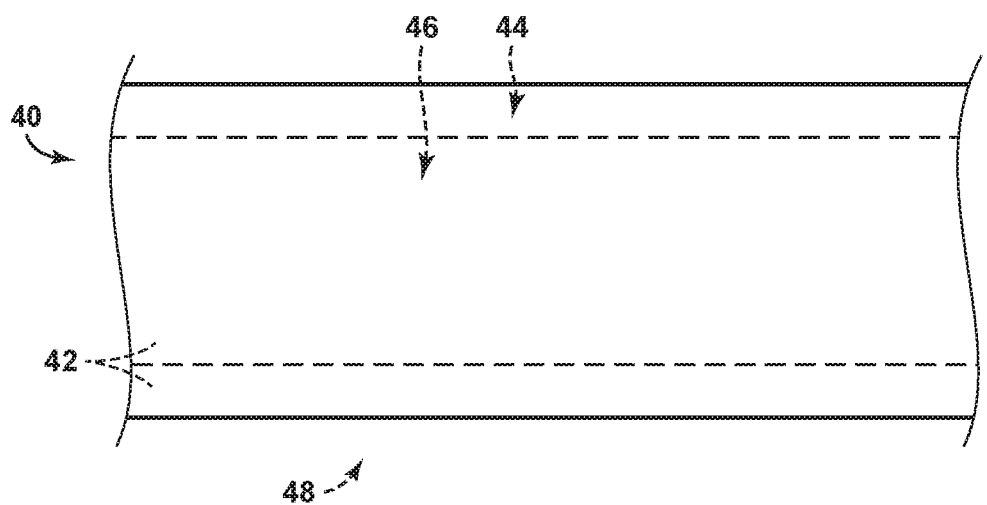
FIG. 3 is another schematic illustration of examples of electromagnetic contrast material that may be included in and/or utilized with hydrocarbon wells and/or methods, according to the present disclosure.
Figure 4:
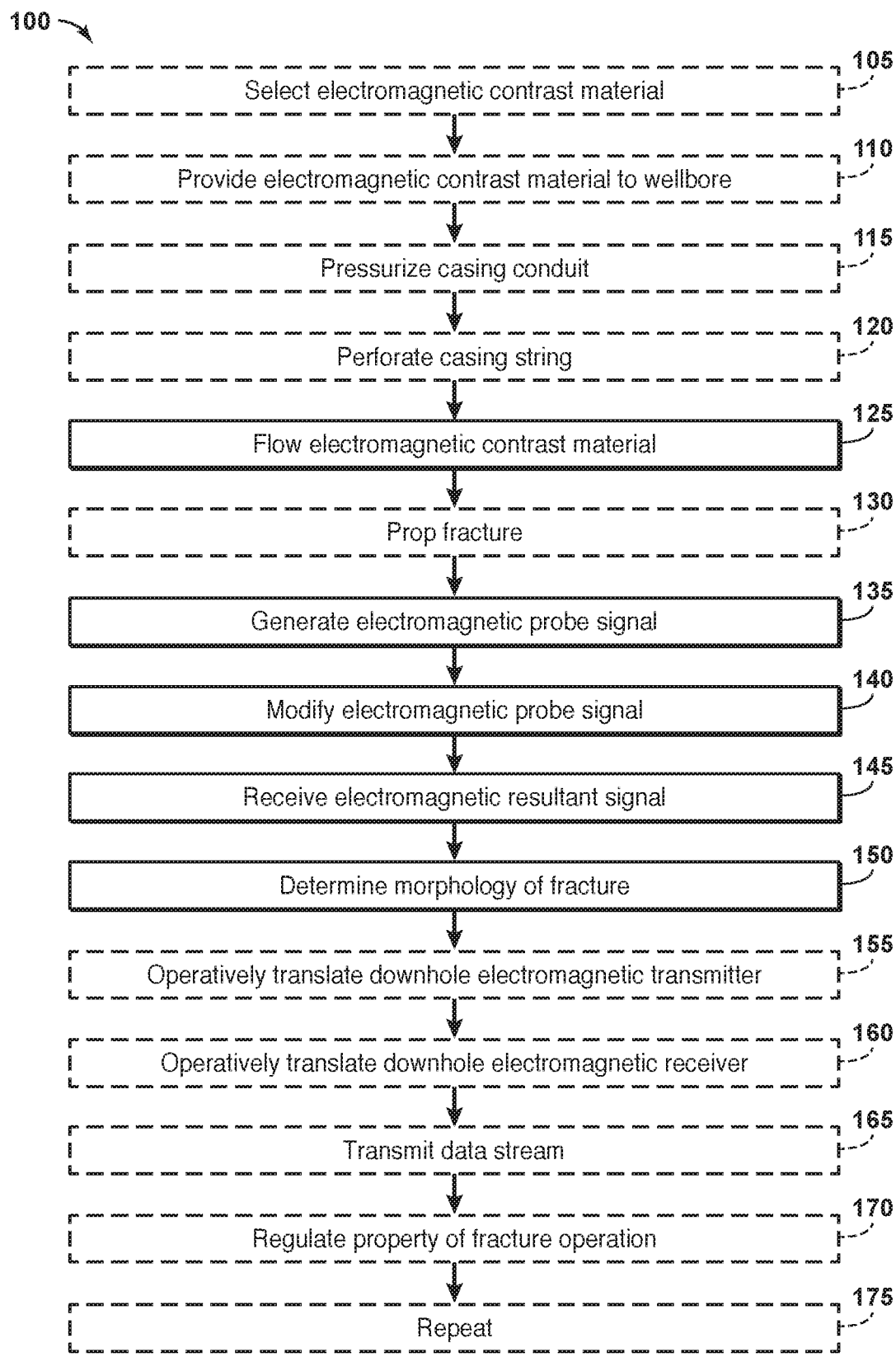
FIG. 4 is a flowchart depicting examples of methods of monitoring a morphology of a fracture that extends from a wellbore of a hydrocarbon well, according to the present disclosure.

FIGS. 2-3 are schematic illustrations of examples of electromagnetic contrast material 40 that may be included in and/or utilized with hydrocarbon wells 18 of FIG. 1 and/or methods 100 of FIG. 4, according to the present disclosure. As discussed, electromagnetic contrast material 40 may include, may be, and/or may function as a proppant 48 for fractures, such as fracture 30 of FIG. 1.

In general, electromagnetic contrast material 40 may include any suitable material that may provide, or that may exhibit, electromagnetic contrast relative to naturally occurring strata that may be present, or that naturally may be present, within subsurface region 12 and/or proximate wellbore 20. This electromagnetic contrast may include any suitable difference in electrical conductivity, difference in permittivity, difference in reflectivity, difference in absorptivity, and/or difference in scattering properties for the electromagnetic probe signal relative, or compared, to the naturally occurring strata.

Electromagnetic contrast material 40 may have and/or define any suitable size and/or shape. As an example, and as illustrated in FIG. 2, electromagnetic contrast material 40 may include and/or be a plurality of round, a plurality of spherical, and/or a plurality of at least substantially spherical particles. Additionally or alternatively, and as illustrated in FIG. 3, electromagnetic contrast material 40 may include and/or be a plurality of cylindrical, or rod-shaped, particles. In some examples, and as discussed, electromagnetic contrast material 40 may function as, may be, and/or may be sized to be a proppant. In some examples, electromagnetic contrast material 40 may be sized to be positioned and/or to flow, within an interstitial space of a proppant material that props fracture 30.

As discussed herein, electromagnetic contrast material 40 may include an electrically conductive material 42, such as a metal and/or an electrically conductive particle. Such electromagnetic contrast material 40 may be defined by the electrically conductive material, may be fully defined by the electrically conductive material, may consist of the electrically conductive material, and/or may consist essentially of the electrically conductive material.

In some examples, electrically conductive material 42 may form and/or define an electrically conductive coating 44 that may coat and/or cover a remainder of the electromagnetic contrast material. In some examples, electrically conductive material 42 may form and/or define an electrically conductive core 46 of the electromagnetic contrast material.

FIG. 4 is a flowchart depicting examples of methods 100 of monitoring a morphology of a fracture that extends from a wellbore of a hydrocarbon well, according to the present disclosure. Methods 100 may include selecting an electromagnetic contrast material at 105, providing the electromagnetic contrast material to the wellbore at 110, pressurizing a casing conduit at 115, and/or perforating a casing string at 120. Methods 100 include flowing the electromagnetic contrast material at 125 and also may include propping a fracture at 130. Methods 100 also include generating an electromagnetic probe signal at 135, modifying the electromagnetic probe signal at 140, receiving an electromagnetic resultant signal at 145, and determining a morphology of the fracture at 150. Methods 100 also may include operatively translating a downhole electromagnetic transmitter at 155, operatively translating a downhole electromagnetic receiver at 160, transmitting a data stream at 165, regulating a property of a fracture operation at 170, and/or repeating at least a portion of the methods at 175.

Selecting the electromagnetic contrast material at 105 may include selecting the electromagnetic contrast material, or at least one property of the electromagnetic contrast material, in any suitable manner and/or based upon any suitable criteria. As an example, the selecting at 105 may include selecting such that the electromagnetic contrast material exhibits electromagnetic contrast relative to naturally occurring strata that may be present, or that naturally may be present, within the subsurface region and/or proximate the wellbore. As another example, the selecting at 105 may include selecting a concentration, or a local concentration, for the electromagnetic contrast material, within the subsurface region and/or within the fracture, that is greater than a concentration of a naturally occurring material, which naturally may be present within the subsurface region, that exhibits electromagnetic contrast similar to that of the electromagnetic contrast material.

As more specific examples, the selecting at 105 may include selecting such that the electromagnetic contrast material exhibits a different electrical conductivity, a different permittivity, a different reflectivity, a different absorptivity, and/or different scattering properties for the electromagnetic probe signal relative to, or when compared to, the naturally occurring strata. Examples of the electromagnetic contrast material are disclosed herein with reference to electromagnetic contrast material 40 of FIGS. 1-3.

Providing the electromagnetic contrast material to the wellbore at 110 may include positioning, or selectively positioning, the electromagnetic contrast material in and/or within the wellbore, such as to permit and/or to facilitate the flowing at 125. In some examples, the providing at 110 may be performed continuously.

In other examples, the providing at 110 may include selectively providing the electromagnetic contrast material to the wellbore based upon and/or responsive to a supply criteria. In these examples, a carrier fluid initially may be provided to the wellbore without the electromagnetic contrast material being contained and/or entrained therein. As an example, the carrier fluid may be provided to the wellbore to clean the wellbore and/or to permit and/or facilitate the pressurizing at 115. Upon satisfaction of the supply criteria, the providing at 110 may be performed, such as to also provide the electromagnetic contrast material to the wellbore. Examples of the supply criteria include initiation of a fracture, or of a fracture event, within the subsurface region, establishing at least a threshold pressure within the wellbore, and/or an initiation of the providing at 110 by an operator of the hydrocarbon well.

In some examples, the providing at 110 may include providing the electromagnetic contrast material in and/or within the carrier fluid. In these examples, the electromagnetic contrast material may be dissolved, dispersed, and/or entrained within the carrier fluid. Also in these examples, the providing at 110 may include modifying a property, or an electromagnetic property, of the carrier fluid, such as to alter the electromagnetic resultant signal. As examples, modification of a density and/or a viscosity of the carrier fluid may produce, generate, and/or cause changes in the resultant signal that may be generated during the modifying at 140 and/or that may be received during the receiving at 145. As another example, and when the carrier fluid includes the magnetorheological fluid, variations in a field strength of the electromagnetic probe signal may be utilized to produce and/or generate variations in the rheology of the carrier fluid.

In some examples, a casing string that defines a casing conduit may extend within the wellbore. In these examples, methods 100 may include pressurizing the casing conduit at 115. The pressurizing at 115 may include pressurizing the casing conduit with and/or utilizing the carrier fluid. When methods 100 include the pressurizing at 115, the carrier fluid also may be referred to herein as and/or may include a fracture fluid. The pressurizing at 115 may include flowing the carrier fluid, with and/or without electromagnetic contrast material contained therein, from a surface region and/or into the casing conduit. During the pressurizing at 115, the casing conduit may be sealed, or at least substantially sealed, to prevent fluid flow of the carrier fluid therefrom, thereby permitting and/or facilitating the pressurizing at 115.

When methods 100 include the pressurizing at 115, methods 100 also may include perforating the casing string at 120. The perforating at 120 may be performed subsequent to the pressurizing at 115; and, responsive and/or subsequent to the perforating at 120, the fracture may be formed within the subsurface region. Stated another way, methods 100 may include forming the fracture, with the forming being responsive to and/or a result of the perforating at 120 and/or a combination of the pressurizing at 115 and the perforating at 120.

Flowing the electromagnetic contrast material at 125 may include flowing the electromagnetic contrast material into the fracture. The electromagnetic contrast material may be entrained within the carrier fluid, when present, which also may flow into the fracture during the flowing at 125, and the flowing at 125 may include flowing the electromagnetic contrast material, and the carrier fluid, into the fracture. This may include flowing the electromagnetic contrast material and/or the carrier fluid from the surface region, within the wellbore, to the fracture, and/or into the fracture.

When methods 100 include the perforating at 120, the flowing at 125 may be responsive to, or a result of, the perforating at 120. Stated another way, the flowing at 125 may include flowing the electromagnetic contrast material from the casing conduit and into the fracture via one or more perforations, within the casing string, that may be formed during the perforating at 120. Stated yet another way, and as discussed, the electromagnetic contrast material may be contained and/or entrained within the fracture fluid, and the flowing at 125 may include flowing the electromagnetic contrast material into the fracture with and/or within the fracture fluid.

Propping the fracture at 130 may include supporting the fracture and/or maintaining the fracture in any suitable manner. As an example, the electromagnetic contrast material may include, may be, and/or may form a portion of a proppant. In this example, the propping at 130 may include propping the fracture with, via, and/or utilizing the electromagnetic contrast material. As another example, a separate proppant, which is distinct from the electromagnetic contrast material, may be provided to the fracture, and the propping at 130 may include propping with the separate proppant. In some examples, the separate proppant, when utilized, may be provided to the fracture with the electromagnetic contrast material, with the carrier fluid, during the flowing at 125, and/or at least partially concurrent with the flowing at 125. In some examples, the separate proppant may be provided to the fracture prior and/or subsequent to the flowing at 125.

Generating the electromagnetic probe signal at 135 may include generating the electromagnetic probe signal with the downhole electromagnetic transmitter. The downhole electromagnetic transmitter may be positioned within the wellbore and/or the generating at 135 may include generating such that the electromagnetic probe signal is incident upon the electromagnetic contrast material.

Modifying the electromagnetic probe signal at 140 may include modifying the electromagnetic probe signal with the electromagnetic contrast material and/or responsive to the electromagnetic probe signal being incident upon the electromagnetic contrast material. Additionally or alternatively, the modifying at 140 may include modifying to produce and/or to generate the electromagnetic resultant signal and/or such that the electromagnetic resultant signal is emitted from and/or by the electromagnetic contrast material.

Receiving the electromagnetic resultant signal at 145 may include receiving the electromagnetic resultant signal with the downhole electromagnetic receiver. The downhole electromagnetic receiver may be positioned within the wellbore and/or the modifying at 140 may include modifying such that the electromagnetic resultant signal is incident upon the downhole electromagnetic receiver.

Determining the morphology of the fracture at 150 may include determining, establishing, estimating, and/or calculating the morphology of the fracture based, at least in part, on the electromagnetic resultant signal and/or on receipt of the electromagnetic resultant signal by the downhole electromagnetic receiver.

Operatively translating the downhole electromagnetic transmitter at 155 may include operatively translating the downhole electromagnetic transmitter within the subsurface region and/or along a length of the wellbore. Similarly, operatively translating the downhole electromagnetic receiver at 160 may include operatively translating the downhole electromagnetic receiver within the subsurface region and/or along the length of the wellbore. The operatively translating at 155 and the operatively translating at 160 are discussed in more detail herein.

In some examples, methods 100 further may include transmitting the data stream at 165. The transmitting at 165 may include transmitting any suitable data stream to the surface region. The data stream may be indicative of the morphology of the fracture, may be based upon the electromagnetic probe signal, may be based upon the electromagnetic resultant signal, and/or may be based upon a comparison between the electromagnetic probe signal and the electromagnetic resultant signal.

The transmitting at 165 may be performed in any suitable manner As an example, a data transmission structure, such as data transmission structure 70 of FIG. 1, may extend within the wellbore, may extend between the downhole electromagnetic receiver and the surface region, and/or may be utilized to convey the data signal between the downhole electromagnetic receiver and the surface region. As a more specific example, an electrical conductor and/or an optical fiber, such as electrical conductor and/or optical fiber 74 of FIG. 1, may extend within the wellbore and/or between the downhole electromagnetic receiver and the surface region. In this example, the transmitting at 165 may include transmitting with, via, and/or utilizing the electrical conductor and/or the optical fiber. As another more specific example, the transmitting at 165 may include wirelessly transmitting the data stream. In this example, the wirelessly transmitting may utilize a downhole wireless communication network, such as downhole wireless communication network 76 of FIG. 1.

As discussed, methods 100 may include the pressurizing at 115 and the perforating at 120. As also discussed, the fracture may be formed responsive to and/or as a result of the pressurizing at 115, the perforating at 120, or a combination of the pressurizing at 115 and the perforating at 120. Formation of the fracture may be referred to herein as a fracture operation, which may include the pressurizing at 115 and/or the perforating at 120. Stated another way, methods 100 may include performing the fracture operation.

When methods 100 include performing the fracture operation, methods 100 also may include regulating the property of the fracture operation at 170. The regulating at 170 may include regulating any suitable property and/or parameter of the fracture operation and may be based, at least in part, on the determining at 150. As an example, the determining at 150 may be utilized to determine, to establish, and/or to quantify an extent of the fracture. In this example, the regulating at 170 may include regulating a flow rate of the carrier fluid, a pressure of the carrier fluid, and/or a total volume of the carrier fluid that is provided to the casing conduit and/or that flows into the fracture based, at least in part, on the extent of the fracture as determined during the determining at 150. As another example, the regulating at 170 may include ceasing supply of the carrier fluid to the casing conduit and/or ceasing formation of the fracture responsive to the determining at 150 indicating that the fracture has reached at least a threshold fracture size and/or extent within the subsurface region.

Repeating at least the portion of the methods at 175 may include repeating any suitable portion of methods 100 in any suitable order. As an example, the repeating at 175 may include repeating the generating at 135, the modifying at 140, the receiving at 145, and the determining at 150 at a plurality of different times to increase measurement resolution regarding the morphology of the fracture, to determine the morphology of the fracture at the plurality of different times, and/or to generate information regarding the morphology of the fracture as a function of time.

As another example, the repeating at 175 may include repeatedly performing the operatively translating at 155 and the operatively translating at 160 to position the downhole electromagnetic transmitter and the downhole electromagnetic receiver in different regions of the wellbore. In this example, the repeating at 175 further may include repeating the generating at 135, the modifying at 140, the receiving at 145, and the determining at 150 within each region of the wellbore, such as to determine the morphology of the fracture within, or adjacent to, each region of the wellbore and/or to generate information regarding the morphology of the fracture, or the morphology of a plurality of distinct fractures, as a function of location, or position, within the subsurface region. Additional and/or more specific examples of the repeating at 175 are disclosed herein.

In some examples, and as discussed in more detail herein with reference to FIG. 1, methods 100 may be performed within a hydrocarbon well that includes a first wellbore, such as wellbore 21 of FIG. 1, and a second wellbore, such as wellbore 22 of FIG. 1. In these examples, the downhole electromagnetic transmitter may be positioned within a transmitting wellbore, which includes one of the first wellbore and the second wellbore, and the downhole electromagnetic receiver may be positioned within a receiving wellbore, which includes the other of the first wellbore and the second wellbore. Stated another way, and in these examples, the generating at 135 may include generating within the first wellbore and/or within the transmitting wellbore, and the receiving at 145 may include receiving within the second wellbore and/or within the receiving wellbore. In these examples, the modifying at 140 may include modifying a phase, an amplitude, and/or a frequency of the electromagnetic probe signal via interaction with the electromagnetic contrast material and/or to produce and/or generate the electromagnetic resultant signal.

In these examples, the operatively translating at 155, when performed, may include operatively translating the downhole electromagnetic transmitter in, within, and/or along the length of the transmitting wellbore. Similarly, the operatively translating at 160, when performed, may include operatively translating the downhole electromagnetic receiver in, within, and/or along the length of the receiving wellbore. The operatively translating at 155 and the operatively translating at 160 may be performed concurrently, or at least substantially concurrently.

In these examples, the operatively translating at 155 and the operatively translating at 160 may include maintaining the downhole electromagnetic transmitter and the downhole electromagnetic receiver equidistant, or at least substantially equidistant, from the surface region. Additionally or alternatively, the operatively translating at 155 and the operatively translating at 160 may include operatively translating the downhole electromagnetic transmitter and the downhole electromagnetic receiver at the same, or at least substantially the same, translation rate. Additionally or alternatively, the operatively translating at 155 and the operatively translating at 160 may include operatively translating the downhole electromagnetic transmitter and the downhole electromagnetic receiver in the same, or in at least substantially the same direction. Stated another way, the operatively translating at 155 and the operatively translating at 160 may be performed such that the downhole electromagnetic transmitter and the downhole electromagnetic receiver remain parallel, or at least substantially parallel, to one other within the subsurface region and/or such that a distance between the downhole electromagnetic transmitter and the downhole electromagnetic receiver is constant, or at least substantially constant.

In these examples, methods 100 may include repeatedly performing, such as during the repeating at 175, the generating at 135, the modifying at 140, the receiving at 145, and the determining at 150 during the operatively translating at 155 and also during the operatively translating at 160. This may permit and/or facilitate determination of the morphology of the fracture as a function of location and/or at a plurality of spaced-apart locations along the length of the transmitting wellbore.

In these examples, and because the downhole electromagnetic transmitter is positioned within the transmitting wellbore and the downhole electromagnetic receiver is positioned within the receiving wellbore, the determining at 150 may include determining the morphology of the fracture within a plane, such as plane 54 of FIG. 1, that extends between the transmitting wellbore and the receiving wellbore and/or that extends between the downhole electromagnetic transmitter and the downhole electromagnetic receiver. This may be referred to herein as generation of a plane array that shows fracture morphology within the plane.

In some examples, and as discussed in more detail herein with reference to FIG. 1, methods 100 may be performed within a hydrocarbon well that includes a single wellbore and/or may be performed with the electromagnetic transmitter and the electromagnetic receiver both positioned within the wellbore, or within the single wellbore. In these examples, the generating at 135 may include transmitting the electromagnetic probe signal from, or away from, the wellbore, and the receiving at 145 may include receiving the electromagnetic resultant signal within the wellbore. In these examples, the modifying at 140 may include reflecting and/or scattering at least a portion of the electromagnetic probe signal toward the wellbore as the electromagnetic resultant signal.

In these examples, the operatively translating at 155, when performed, may include operatively translating the downhole electromagnetic transmitter in, within, and/or along the length of the wellbore, or the single wellbore. Similarly, the operatively translating at 160, when performed, may include operatively translating the downhole electromagnetic receiver in, within, and/or along the length of the wellbore of the single wellbore. This may include maintaining a fixed, or an at least substantially fixed, relative orientation, or distance, between the downhole electromagnetic transmitter and the downhole electromagnetic receiver during the operatively translating at 155 and during the operatively translating at 160. As an example, the downhole electromagnetic transmitter and the downhole electromagnetic receiver may be operatively attached to one another and/or may be configured to translate as a unit during the operatively translating at 155 and during the operatively translating at 160.

In these examples, methods 100 may include repeatedly performing, such as during the repeating at 175, the generating at 135, the modifying at 140, the receiving at 145, and the determining at 150 during the operatively translating at 155 and also during the operatively translating at 160. This may permit and/or facilitate determination of the morphology of the fracture as a function of location and/or at a plurality of spaced-apart locations along the length of the wellbore, or of the single wellbore.

In these examples, the determining at 150 may include determining an average depth of penetration of the electromagnetic probe signal and/or an average fracture extent, or distance, from the wellbore as a function of position, or location, along the length of the wellbore. Additionally or alternatively, the determining at 150 may include determining a fracture height along, or as measured along, the length of the wellbore and/or determining a concentration of electromagnetic contrast material as a function of position, or location, along the length of the wellbore.

Hydrocarbon wells 18 and/or methods 100, which are disclosed herein, may be utilized with a variety of different processes and/or operations. In some examples, the repeating at 175 may include repeatedly performing at least the flowing at 125, the generating at 135, the modifying at 140, the receiving at 145, and the determining at 150 during a monitoring timeframe.

In one such example, the carrier fluid may include and/or be a drilling mud for a drilling operation of the hydrocarbon well. In this example, the repeating at 175 may include repeating to monitor for, or to detect, lost returns due to fracture formation during the drilling operation.

In another such example, the carrier fluid may include and/or be a cuttings re-injection fluid that includes drill cuttings and that is utilized as part of a cuttings re-injection operation. In this example, methods 100 may include forming the fracture via flow of the cuttings re-injection fluid onto the subsurface region, and the repeating at 175 may include repeating to measure and/or monitor fracture growth during the cuttings re-injection operation.

In another such example, the carrier fluid may include produced water that may be utilized as part of a water re-injection operation. In this example, methods 100 may include forming the fracture via flow of the produced water into the subsurface region, and the repeating at 175 may include repeating to measure and/or monitor fracture growth during the water re-injection operation.

In the present disclosure, several of the illustrative, non-exclusive examples have been discussed and/or presented in the context of flow diagrams, or flow charts, in which the methods are shown and described as a series of blocks, or steps. Unless specifically set forth in the accompanying description, it is within the scope of the present disclosure that the order of the blocks may vary from the illustrated order in the flow diagram, including with two or more of the blocks (or steps) occurring in a different order and/or concurrently.

As used herein, the term "and/or" placed between a first entity and a second entity means one of (1) the first entity, (2) the second entity, and (3) the first entity and the second entity. Multiple entities listed with "and/or" should be construed in the same manner, i.e., "one or more" of the entities so conjoined. Other entities may optionally be present other than the entities specifically identified by the "and/or" clause, whether related or unrelated to those entities specifically identified. Thus, as a non-limiting example, a reference to "A and/or B," when used in conjunction with open-ended language such as "comprising" may refer, in one embodiment, to A only (optionally including entities other than B); in another embodiment, to B only (optionally including entities other than A); in yet another embodiment, to both A and B (optionally including other entities). These entities may refer to elements, actions, structures, steps, operations, values, and the like.

As used herein, the phrase "at least one," in reference to a list of one or more entities should be understood to mean at least one entity selected from any one or more of the entities in the list of entities, but not necessarily including at least one of each and every entity specifically listed within the list of entities and not excluding any combinations of entities in the list of entities. This definition also allows that entities may optionally be present other than the entities specifically identified within the list of entities to which the phrase "at least one" refers, whether related or unrelated to those entities specifically identified. Thus, as a non-limiting example, "at least one of A and B" (or, equivalently, "at least one of A or B," or, equivalently "at least one of A and/or B") may refer, in one embodiment, to at least one, optionally including more than one, A, with no B present (and optionally including entities other than B); in another embodiment, to at least one, optionally including more than one, B, with no A present (and optionally including entities other than A);

in yet another embodiment, to at least one, optionally including more than one, A, and at least one, optionally including more than one, B (and optionally including other entities). In other words, the phrases "at least one," "one or more," and "and/or" are open-ended expressions that are both conjunctive and disjunctive in operation. For example, each of the expressions "at least one of A, B, and C," "at least one of A, B, or C," "one or more of A, B, and C," "one or more of A, B, or C," and "A, B, and/or C" may mean A alone, B alone, C alone, A and B together, A and C together, B and C together, A, B, and C together, and optionally any of the above in combination with at least one other entity.

In the event that any patents, patent applications, or other references are incorporated by reference herein and (1) define a term in a manner that is inconsistent with and/or (2) are otherwise inconsistent with, either the non-incorporated portion of the present disclosure or any of the other incorporated references, the non-incorporated portion of the present disclosure shall control, and the term or incorporated disclosure therein shall only control with respect to the reference in which the term is defined and/or the incorporated disclosure was present originally.

As used herein, the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It is also within the scope of the present disclosure that elements, components, and/or other recited subject matter that is recited as being adapted to perform a particular function may additionally or alternatively be described as being configured to perform that function, and vice versa.

As used herein, the phrase, "for example," the phrase, "as an example," and/or simply the term "example," when used with reference to one or more components, features, details, structures, embodiments, and/or methods according to the present disclosure, are intended to convey that the described component, feature, detail, structure, embodiment, and/or method is an illustrative, non-exclusive example of components, features, details, structures, embodiments, and/or methods according to the present disclosure. Thus, the described component, feature, detail, structure, embodiment, and/or method is not intended to be limiting, required, or exclusive/exhaustive; and other components, features, details, structures, embodiments, and/or methods, including structurally and/or functionally similar and/or equivalent components, features, details, structures, embodiments, and/ or methods, are also within the scope of the present disclosure.

As used herein, "at least substantially," when modifying a degree or relationship, may include not only the recited "substantial" degree or relationship, but also the full extent of the recited degree or relationship. A substantial amount of a recited degree or relationship may include at least 75% of the recited degree or relationship. For example, an object that is at least substantially formed from a material includes objects for which at least 75% of the objects are formed from the material and also includes objects that are completely formed from the material. As another example, a first length that is at least substantially as long as a second length includes first lengths that are within 75% of the second length and also includes first lengths that are as long as the second length.

INDUSTRIAL APPLICABILITY

The systems and methods disclosed herein are applicable to the hydrocarbon well drilling and completion industries.

It is believed that the disclosure set forth above encompasses multiple distinct inventions with independent utility. While each of these inventions has been disclosed in its preferred form, the specific embodiments thereof as disclosed and illustrated herein are not to be considered in a limiting sense as numerous variations are possible. The subject matter of the inventions includes all novel and non-obvious combinations and subcombinations of the various elements, features, functions, and/or properties disclosed herein. Similarly, where the claims recite "a" or "a first" element or the equivalent thereof, such claims should be understood to include incorporation of one or more such elements, neither requiring nor excluding two or more such elements.

It is believed that the following claims particularly point out certain combinations and subcombinations that are directed to one of the disclosed inventions and are novel and non-obvious. Inventions embodied in other combinations and subcombinations of features, functions, elements, and/or properties may be claimed through amendment of the present claims or presentation of new claims in this or a related application. Such amended or new claims, whether they are directed to a different invention or directed to the same invention, whether different, broader, narrower, or equal in scope to the original claims, are also regarded as included within the subject matter of the inventions of the present disclosure.

What is claimed is:

1. A hydrocarbon well, comprising:
a wellbore that extends within a subsurface region;
a fracture that extends from the wellbore and within the subsurface region;
an electromagnetic contrast material positioned within the fracture upon satisfaction of a supply criteria comprising an establishment of at least a threshold pressure within the wellbore;
a downhole electromagnetic transmitter configured to direct an electromagnetic probe signal incident upon the electromagnetic contrast material;
a downhole electromagnetic receiver configured to receive an electromagnetic resultant signal from the electromagnetic contrast material and
wherein a property of a fracturing operation is regulated based on determining a morphology of the fracture from the resultant signal.

2. The hydrocarbon well of claim 1, wherein the wellbore is a first wellbore, wherein the hydrocarbon well further includes a second wellbore, wherein the downhole electromagnetic transmitter is positioned within one of the first wellbore and the second wellbore, and further wherein the downhole electromagnetic receiver is positioned within the other of the first wellbore and the second wellbore.

3. The hydrocarbon well of claim 1, wherein the electromagnetic contrast material includes an electrically conductive material.

4. The hydrocarbon well of claim 1, wherein the downhole electromagnetic transmitter and the downhole electromagnetic receiver both are positioned within the wellbore.

5. The hydrocarbon well of claim 4, wherein the electromagnetic contrast material includes at least one of:
(i) an electromagnetically shielding material;
(ii) an electromagnetically shielding liquid;
(iii) an electromagnetically shielding particulate;
(iv) a material that scatters electromagnetic radiation;
(v) a liquid that scatters electromagnetic radiation; and
(vi) a particulate that scatters electromagnetic radiation.

6. The hydrocarbon well of claim 1, wherein the electromagnetic contrast material exhibits electromagnetic contrast relative to naturally occurring strata present within the subsurface region.

7. A method of monitoring a morphology of a fracture that extends from a wellbore of a hydrocarbon well and within a subsurface region, the method comprising:
flowing an electromagnetic contrast material from the wellbore and into the fracture, upon satisfaction of a supply criteria comprising an establishment of at least a threshold pressure within the wellbore;
generating an electromagnetic probe signal with a downhole electromagnetic transmitter such that the electromagnetic probe signal is incident upon the electromagnetic contrast material;
modifying the electromagnetic probe signal, with the electromagnetic contrast material, to generate an electromagnetic resultant signal;
receiving the electromagnetic resultant signal with a downhole electromagnetic receiver;
determining the morphology of the fracture based, at least in part, on the electromagnetic resultant signal; and
regulating a property of a fracturing operation based on the determining the morphology of the fracture.

8. The method of claim 7, wherein the wellbore is a first wellbore, wherein the downhole electromagnetic transmitter is positioned within a transmitting wellbore that includes one of the first wellbore and a second wellbore, and further wherein the downhole electromagnetic receiver is positioned within a receiving wellbore that includes the other of the first wellbore and the second wellbore, wherein the generating includes generating within the first wellbore, and further wherein the receiving includes receiving within the second wellbore.

9. The method of claim 8, wherein the method further includes operatively translating the downhole electromagnetic transmitter along a length of the transmitting wellbore and concurrently operatively translating the downhole electromagnetic receiver along a length of the receiving wellbore, wherein the operatively translating the downhole electromagnetic transmitter and the concurrently operatively translating the downhole electromagnetic receiver includes at least one of:
(i) maintaining the downhole electromagnetic transmitter and the downhole electromagnetic receiver at least substantially equidistant from a surface region;
(ii) operatively translating the downhole electromagnetic transmitter and the downhole electromagnetic receiver at substantially the same translation rate; and
(iii) operatively translating the downhole electromagnetic transmitter and the downhole electromagnetic receiver in substantially the same direction.

10. The method of claim 9, wherein, during the operatively translating the downhole electromagnetic transmitter and the concurrently operatively translating the downhole electromagnetic receiver, the method further includes repeatedly performing the generating, the modifying, the receiving, and the determining to determine the morphology of the fracture at a plurality of spaced-apart locations along the length of the transmitting wellbore.

11. The method of claim 8, wherein the modifying the electromagnetic probe signal includes at least one of:
(i) modifying a phase of the electromagnetic probe signal to generate the electromagnetic resultant signal;
(ii) modifying an amplitude of the electromagnetic probe signal to generate the electromagnetic resultant signal; and
(iii) modifying a frequency of the electromagnetic probe signal to generate the electromagnetic resultant signal.

12. The method of claim 8, wherein the determining includes determining the fracture morphology within a plane that extends between the first wellbore and the second wellbore.

13. The method of claim 8, wherein the electromagnetic contrast material includes an electrically conductive material.

14. The method of claim 7, wherein the downhole electromagnetic transmitter and the downhole electromagnetic receiver both are positioned within the wellbore, wherein the generating includes at least one of:
(i) transmitting the electromagnetic probe signal from the wellbore; and
(ii) transmitting the electromagnetic probe signal away from the wellbore; and
further wherein the receiving includes receiving within the wellbore.

15. The method of claim 14, wherein the method further includes operatively translating the downhole electromagnetic transmitter and the downhole electromagnetic receiver along the length of the wellbore, and maintaining an at least substantially fixed relative orientation between the downhole electromagnetic transmitter and the downhole electromagnetic receiver during the operatively translating.

16. The method of claim 15, wherein, during the operatively translating, the method further includes repeatedly performing the generating, the modifying, the receiving, and the determining to determine the morphology of the fracture at a plurality of spaced-apart locations along a length of the wellbore.

17. The method of claim 14, wherein the determining includes determining at least one of:
(i) an average depth of penetration of the electromagnetic probe signal as a function of position along the length of the wellbore;
(ii) an average fracture extent, from the wellbore, as a function of position along the length of the wellbore;
(iii) a fracture height as measured along the length of the wellbore; and
(iv) a concentration of electromagnetic contrast material as a function of position along the length of the wellbore.

18. The method of claim 7, wherein the modifying includes at least one of:
(i) reflecting at least a portion of the electromagnetic probe signal toward the wellbore as the electromagnetic resultant signal; and
(ii) scattering at least a portion of the electromagnetic probe signal toward the wellbore as the electromagnetic resultant signal.

19. The method of claim 7, wherein the electromagnetic contrast material includes at least one of:
(i) an electromagnetically shielding material;
(ii) an electromagnetically shielding liquid;
(iii) an electromagnetically shielding particulate;
(iv) a material that scatters electromagnetic radiation;

(v) a liquid that scatters electromagnetic radiation; and (vi) a particulate that scatters electromagnetic radiation.

20. The method of claim 7, wherein the method further includes selecting the electromagnetic contrast material such that the electromagnetic contrast material exhibits electromagnetic contrast relative to naturally occurring strata present within the subsurface region.

21. The method of claim 7, wherein the flowing the electromagnetic contrast material includes flowing the electromagnetic contrast material within a carrier fluid.

22. The method of claim 21, wherein a casing string that defines a casing conduit extends within the wellbore, wherein the carrier fluid includes a fracture fluid, and further wherein the method includes:

(i) pressurizing the casing conduit with the fracture fluid; and (ii) subsequent to the pressurizing, perforating the casing conduit to form the fracture.

23. The method of claim 22, wherein the flowing is responsive to the perforating.

24. The method of claim 21, wherein the method further includes modifying an electromagnetic property of the carrier fluid to alter the electromagnetic resultant signal.

25. The method of claim 7, wherein the generating the electromagnetic probe signal includes generating at a probe signal frequency of at least 10 MHz and at most 2.5 GHz.

\* \* \* \* \*